July 8, 1958  E. SCHUSTER  2,842,146
FLUID PRESSURE REGULATOR AND SAFETY DEVICE
Filed Jan. 3, 1956  2 Sheets-Sheet 1

INVENTOR.
ERICH SCHUSTER
BY
ATTORNEY.

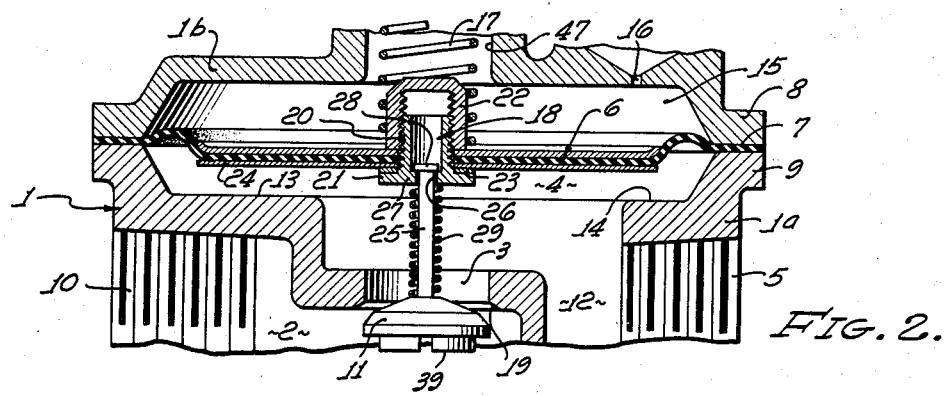
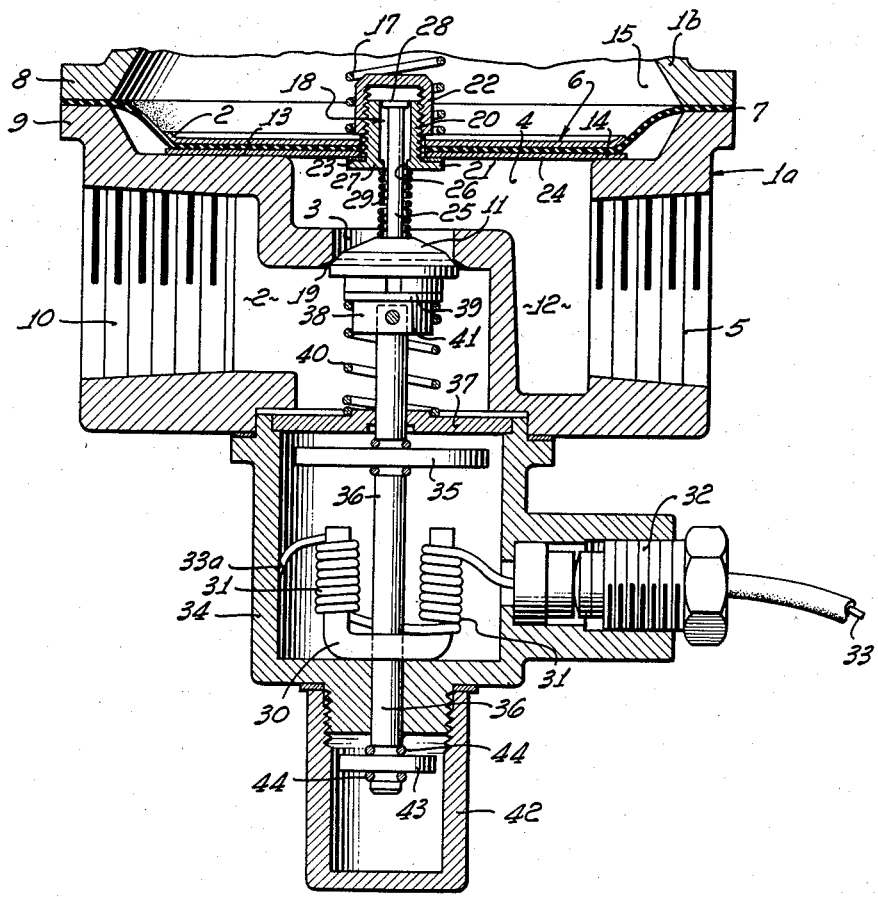

Patented July 8, 1958

2,842,146

FLUID PRESSURE REGULATOR AND SAFETY DEVICE

Erich Schuster, Los Angeles, Calif., assignor to Thermac Company, a corporation of California Application January 3, 1956, Serial No. 557,005

7 Claims. (Cl. 137—66)

This invention relates to apparatus for regulating the supply of a fluid, for example, a gaseous fuel, to a burner or burners. Such apparatus functions to maintain a sufficient supply of the gas to meet the requirements at the burners and in doing so, automatically maintains a substantially constant pressure at the outlet of a control valve through which the gas flows.

It is the present practice to employ a thermo-couple that is kept warm by its proximity to the pilot flame, to insure that the gas when admitted will become ignited automatically by the pilot burner whenever the gas is turned on. For this reason in some installations a safety valve in addition to the pressure control valve is provided and functions automatically if the pilot flame has become accidentally extinguished, to close the safety valve and prevent an escape of gas at the burner that might otherwise cause a dangerous explosion.

One of the objects of this invention is to provide a single valve device that is provided with features of construction that enable it to perform normally the functions of a regulator valve; but if the pilot burner becomes extinguished, will then operate to close the regulator valve. This of course, combines these two important functions in one valve.

This also accomplishes a considerable economy in production and installation of such apparatus.

Regulator valves such as referred to, usually employ a closed pressure chamber that co-operates with adjacent pressure-sensitive means, usually in the form of a diaphragm, the other side of which is exposed to the fluid flowing in the gas duct through the valve.

The pressure-chamber is vented to the atmosphere so as to maintain atmospheric pressure within it. Sometimes for practical reasons this vent to the atmosphere must be relatively small and this renders it subject to becoming clogged with accumulating sand or dirt.

In such a case when the apparatus is performing its safety function of pushing the valve closure up to its closed position the incidental upward movement of the diaphragm may cause a rise in pressure in the pressure chamber which resists the closing of the valve.

One of the objects of this invention is to provide means associated with the valve-stem that will operate to permit the valve closure to move onto its seat without imparting an upward movement to the pressure-sensitive member that in the normal operation of the valve, controls the degree of opening of the valve-closure, that is to say, its distance from its seat.

Further objects of the invention will be evident from a careful reading of this specification, and a study of the accompanying drawing.

The invention consists in the novel parts, and combinations of parts to be described hereinafter, all of which contribute to produce an efficient fluid pressure regulator and safety device.

A preferred embodiment of the invention is described in the following specification, while the broad scope of the invention is pointed out in the appended claims.

In the drawing:

Figure 1 is a vertical section through a valve device embodying my invention, and which constitutes a pressure regulator valve and safety shut-off for the same. This view shows a short portion of the electric connection that leads to this device from a pilot burner, not illustrated. This view shows the valve-closure in its position of rest with the parts in the relation they would have before the fluid is admitted from the supply pipe to flow through the valve casing.

Figure 2 is a fragmentary view and shows the pressure sensitive means and the valve-closure in the position and relation they have when the valve closure is operating to control the amount of flow of the fluid through the valve duct to its outlet.

Figure 3 is a vertical section similar to Figure 1 but broken away above, and showing the valve closure on its valve-seat, and in the position it would have when the automatic shut-off means operates when the pilot valve has become extinguished and cuts off the flow of electric current to the electro-magnetic means that normally holds the actuator inactive.

Figure 1:
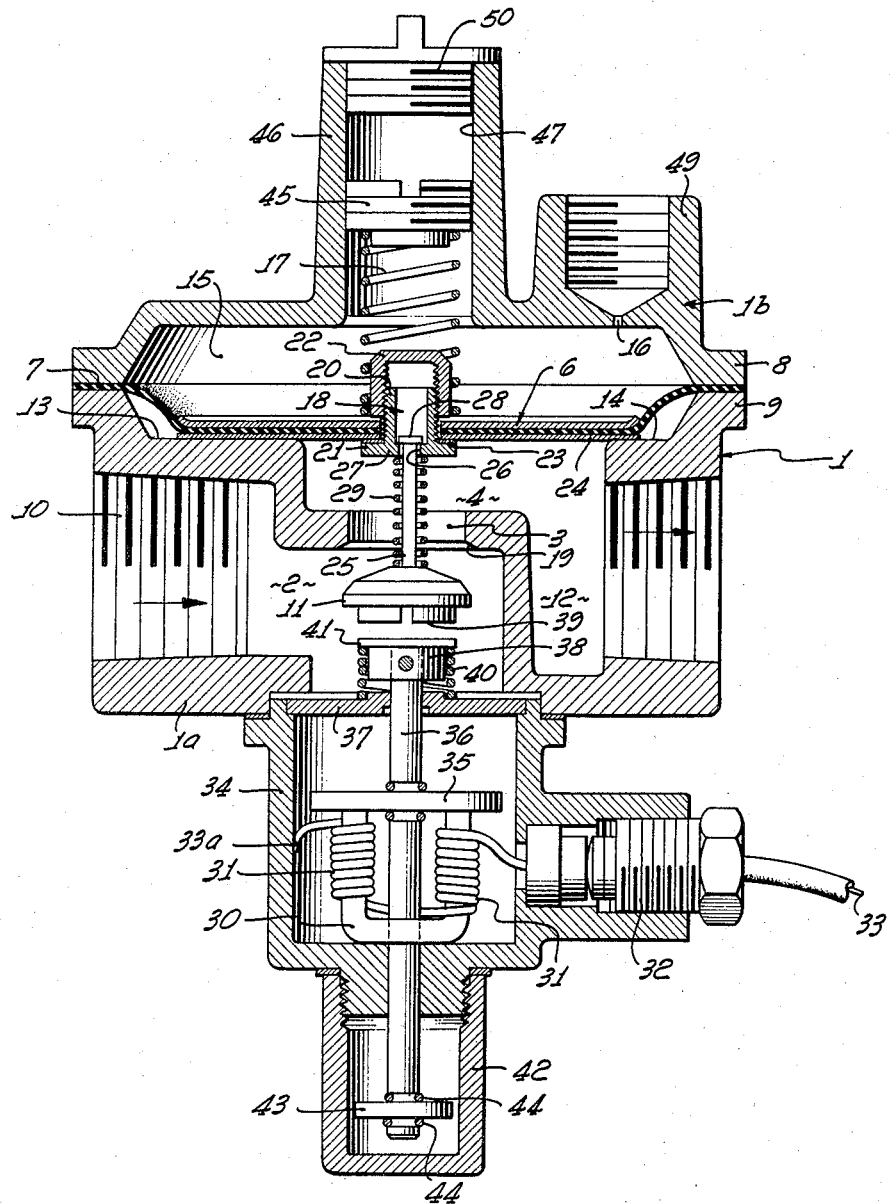

Referring more particularly to the parts, this device includes a valve casing 1, including a valve-body 1a and a dished bonnet 1b.

In practicing the invention, between the valve body and the bonnet a pressure sensitive means, or part is provided, one side of which is exposed to the fluid that is flowing through the duct 2 that passes through the valve-body from left to right as indicated by the arrows. In the present instance the fluid flows up through a valve port 3, and then the fluid fills a flow chamber 4 before it passes downwardly in the duct 2 and through the outlet 5. In the present instance, the pressure-sensitive means illustrated is a flexible diaphragm 6, the margin 7 of which is clamped between flanges 8 and 9 formed at the peripheries of the body 1a and the bonnet. These flanges are connected together by bolts (not illustrated).

Referring now to Figure 1, when the fluid to be regulated is admitted through the inlet 10 of the valve body it flows past the valve closure 11 up through the port 3 and a downward extension 12 that constitutes a portion of the duct 2, and thence through the outlet 5. This subjects the underside of the diaphragm 6 to pressure and lifts it off the horizontal faces 13 and 14 that operate as a shelf upon which the diaphragm may rest in its extreme low position, as shown in Figure 1.

By reason of the pressure of the fluid in the flow chamber 4, the diaphragm will move to a raised position such as is illustrated in Figure 2. This position will be arrived at when the pressure in the flow-chamber approximates the pressure in the pressure chamber 15, located on the underside of the bonnet 1b; this chamber is provided with the usual small vent 16 which is, in the present instance a lead to the atmosphere, and functions to maintain a pressure within the pressure-chamber substantially equal to the atmospheric pressure existing at the location of the device.

After equilibrium is established between the pressure in the flow chamber and that existing in the pressure chamber 15 (assisted by the light coil spring 17), the device is ready to function as a regulator for the supply of fluid such as gas fuel to a burner or burners supplied through the device; in doing so, when additional burners are operated and lighted, the pressure in the flow-chamber will fall substantially, thereby enabling the diaphragm to descend, which also lowers the valve closure 11, which is suspended from the central portion of the diaphragm. In accordance with my invention, this is effected by employing a lost-motion connection between the diaphragm and the valve closure. It operates to control the position of the valve-closure 11 as required to enable the device to function effectively as a regulator supplying a controlled amount of fluid that will pass through the valve duct.

But by reason of the lost-motion connection, or slip connection 18, that I employ, the connection enables the valve-closure to be lifted by the safety apparatus of the device to move the valve-closure onto its seat 19 without imparting any lifting movement to the pressure-control means. This gives a very quick and sure closing of the valve, and is important in case the vent 16 has become accidentally obstructed by dirt or sand.

In accordance with my invention I provide a slip-connection, that is, a lost-motion device, somewhere between the valve-head 11 and the pressure-control device, which functions so that the movements of the pressure-control means will be normally imparted to the valve closure, but when the electro-magnetic means functions to effect the closing of the valve it can do so without imparting movement to the control means.

However, I do not limit myself to the specific location illustrated for the lost-motion connection, and as a matter of fact, it could be located anywhere between the valve head and the diaphragm, or pressure-control member.

By way of example, the lost-motion connection 18 may be associated with the upper end of the valve-stem where it connects to the pressure-control means. The lost-motion connection I illustrate includes a ferrule 20, the body of which is in the form of a sleeve threaded on its exterior, and having a flange 21 at its lower end. Between the flange 21 and the lower end of a tubular cap 22, a compressible fluid tight washer or gasket 23 is provided, surrounding and sealing off the hole through the flexible sheet portion 24 of the diaphragm 6 through which the ferrule extends up from below.

In this specific construction the valve-stem 25 passes up through a small opening 26 in the disc or head 27 that forms the lower end of the ferrule 20, through which it fits neatly; and within the bore of the ferrule the stem 25 is upset to form a small button or head 28, the lower end of which presents an annular shoulder that normally rides on the edge of the opening 26, as shown in Figure 2.

Resilient means is provided, preferably in the form of a coil-spring 29 surrounding the stem, resting at its lower end on the upper face of the valve-closure, and thrusting at its upper end against the lower face of the ferrule. This spring is a relatively weak spring but is strong enough to hold the valve 11 yieldingly in its extreme low position while this device is functioning as a fluid regulator.

The electro-magnetic means illustrated includes a bipolar electro-magnet 30 the poles whereof carry coils 31 taking current through a plug 32 and a wire 33 leading from the thermo-couple kept hot by the pilot flame. This circuit may be grounded beyond the magnet at 33a against the wall of the sub-casing 34.

The armature 35 is on a long stem 36 and is normally held captive by the magnet. The upper end of the stem 36 is guided through the cover 37 of the sub-casing 34 and carries a collar 38 secured to it by a cotter pin. The collar operates as an actuator or pusher-head to engage the lower face 39 of valve 11 when the armature 35 is released by the absence of current in the coils which, of course, de-energizes the magnet.

The upward movement of the pusher-head 38 is accomplished by a relatively strong coil spring 40 centered on the pusher-head to thrust upwardly normally against the under face of a flange 41 that projects laterally to take the thrust of the spring 40. This spring is relatively strong and it readily causes the rising valve head to compress the light spring 29 as the valve 11 moves up and closes against its seat 19.

When a safety shut-off has occurred, the valve closure can be reset after the pilot burner has been relit, by removing the screw cap 42, and pushing up the handle disc 43 that is secured to the lower end of the stem between spring rings 44.

Above the spring 17 a plug 45 is threaded into the tubular neck 46 that extends up from the cover wall of the bonnet 1b. This plug is commonly employed in regulators of this type for enabling the force exerted by the spring upon the diaphragm to be altered as desired. The cylindrical bore 47 of this neck is threaded from its mouth to a point sufficiently beyond any position to which the plug must be adjusted down. And the mouth of the neck 46 is closed by the usual threaded cap.

The vent to atmosphere, referred to above, is shown in its usual location at the bottom of a socket 49, the wall of which is integral with the cover wall of the bonnet 1b, and this socket may be provided, as shown, with threads to enable a pipe connection to lead off from the same if desired to connect to the atmosphere at a point removed from the immediate location of this regulator device, or for any other purpose.

A screw-cap 50 closes the neck 46.

Many other embodiments of this invention may be resorted to without departing from the spirit of the invention.

I claim as my invention, and desire to secure by Letters Patent:

1. In a combined fluid pressure regulator and safety device, the combination of a valve casing having a duct therethrough for the fluid, pressure-sensitive means mounted in said casing exposed on one side to the fluid current passing through said duct, said casing having a pressure chamber to which the other side of said pressure-sensitive means is exposed, a valve-port in said casing through which the fluid flows, a valve-closure for the same, having its valve-seat on the end of said valve-opening remote from the said pressure-sensitive means, and co-operating with the valve-opening to regulate the flow of the fluid passing through said duct, a stem carried by the valve-closure, a connection between said stem and said pressure-sensitive means enabling the pressure-sensitive means to effect movement of the valve-closure toward and from the valve-seat to regulate the flow of fluid through said duct; means guided within said casing including an actuator located out of the path of movement of the valve-closure when controlled by said pressure-sensitive means, an armature operatively associated with said actuator, electro-magnetic means for normally holding the armature captive, and adapted to be connected in an electric circuit to a pilot burner, and means for moving said actuator to engage the valve-closure and advance the same onto its seat when the armature is released by the electromagnet; the said connection between the stem and said pressure sensitive means including means permitting independent movement of said stem with respect to said pressure-sensitive means.

2. A combined fluid pressure regulator and safety device, according to claim 1, including resilient means for normally holding the valve closure in an extreme position beyond its seat with respect to said pressure-sensitive means.

3. A combined fluid pressure regulator and safety device, according to claim 1, including resilient means capable of overcoming the strength of said first named resilient means to effect the closing of the valve-closure upon its seat when the armature has been released.

4. A combined fluid pressure regulator and safety device, according to claim 1, including a spring for normally holding the valve-closure in an extreme extended position beyond the valve seat, and in which the connection between the stem and the diaphragm is a lost-motion connection to permit the valve-closure to close upon its seat regardless of the position of the pressure-sensitive means.

5. In a combined fluid pressure regulator and safety device, the combination of a valve casing having a duct therethrough for the fluid, said casing having a pressure-sensitive diaphragm mounted therein exposed on one side to the fluid current passing through the duct, said casing also having a pressure chamber therein to which the opposite side of said diaphragm is exposed, said chamber having a vent outlet, said casing having a valve port therein with a valve seat on the side remote from said diaphragm, a valve-closure having a stem with a lost motion connection to said diaphragm, said sleeve having a bore receiving the upper portion of said stem, and having a guide-opening for said stem adjacent the valve-closure, said stem having a shoulder riding on the edge of said guide-opening, a coil spring surrounding said stem thrusting against said sleeve and the valve-closure and normally holding the stem and the valve-closure in an extreme extended position, an actuator guided in the casing in line with the valve-closure, an armature connected to said actuator with electromagnetic means associated therewith; and a spring normally held in compression while the armature is held captive and operating when the same is released, to permit the last named spring to force the actuator against the valve-closure to move the same onto its seat.

6. In a combined fluid pressure regulator and safety valve, the combination of a valve casing having a duct therein for the fluid, a pressure-sensitive diaphragm mounted in the casing exposed on one side to the fluid current in said duct, said casing also having a pressure chamber therein adjacent the opposite side of said diaphragm, and having a vent outlet from the same, said casing having a valve-port in said duct with a valve-closure on the side thereof remote from the duct, a valve-closure adapted to move toward, and onto, said seat, and having a stem passing through the port, a connection for guiding said stem through said diaphragm, said stem and said connection having correlated means enabling movements of the diaphragm to control the position of the valve-closure with respect to the valve seat to regulate the volume of fluid flowing through the duct, a relatively weak coil spring mounted between the diaphragm and the valve-closure for normally holding the valve stem and valve closure in an extreme position with respect to the diaphragm; an armature with electromagnetic means for normally holding the same captive, an actuator operatively connected with the armature so as to be freely movable when the electromagnetic means releases the armature; and a relatively strong spring for moving the actuator against the valve closure to overcome the resistance of the first named spring and close the same onto its seat.

7. A combined fluid pressure regulator and safety-shut-off device adapted to co-operate with a thermocouple and pilot burner, the combination of a valve casing with a duct therein through which the fluid flows to a point where the fluid is used, a single valve-closure for controlling flow through said duct, a pressure control means having a connection to the valve-closure for imparting shifting movements to the valve-closure to regulate the effective opening past the valve-closure to regulate the rate of delivery of the fluid through the duct; electromagnetic means controlled from the said thermocouple for effecting movement of the said closure to its closed position to shut off flow through the duct, said connection including a lost-motion device enabling the said closing movement of the valve-closure to be accomplished independently of, and without imparting movement to, said pressure control means.

References Cited in the file of this patent

UNITED STATES PATENTS

| 2,198,895 | Wetzel | Apr. 30, 1940 |
| 2,721,570 | Caparone | Oct. 25, 1955 |